United States Patent [19]

Mazanek et al.

[11] 4,169,206
[45] Sep. 25, 1979

[54] POLYMERS CONTAINING AMINO GROUPS AND HYDROXYL AND/OR MERCAPTO GROUPS AND THE USE THEREOF FOR THE PRODUCTION OF POLYURETHANE RESINS

[75] Inventors: Jan Mazánek; Johannes Blahak, both of Cologne, Fed. Rep. of Germany

[73] Assignee: Bayer Aktiengesellschaft, Leverkusen, Fed. Rep. of Germany

[21] Appl. No.: 793,233

[22] Filed: May 2, 1977

[30] Foreign Application Priority Data

May 5, 1976 [DE] Fed. Rep. of Germany ....... 2619840

[51] Int. Cl.$^2$ .................. C07C 101/54; C08J 9/00
[52] U.S. Cl. ................. 560/50; 260/455 R; 560/19; 521/129; 521/163
[58] Field of Search ............... 560/50, 19; 260/455 R

[56]  References Cited
U.S. PATENT DOCUMENTS

| 3,808,250 | 4/1974 | Blahak et al. | 260/455 R |
| 3,817,940 | 6/1974 | Blahak et al. | 560/50 |
| 3,929,863 | 12/1975 | Blahak et al. | 560/50 |

Primary Examiner—James O. Thomas, Jr.
Assistant Examiner—G. T. Breitenstein
Attorney, Agent, or Firm—Gene Harsh; Joseph C. Gil; R. Brent Olson

[57] ABSTRACT

The invention relates to compositions containing both amino groups and hydroxyl and/or mercapto groups. The products are obtained by reacting relatively high molecular weight polyols and/or polythiols with less than equivalent quantities of isatoic acid anhydride.

5 Claims, No Drawings

POLYMERS CONTAINING AMINO GROUPS AND HYDROXYL AND/OR MERCAPTO GROUPS AND THE USE THEREOF FOR THE PRODUCTION OF POLYURETHANE RESINS

BACKGROUND OF THE INVENTION

It has been found that when nucleophilic reagents are reacted with isatoic anhydride (R. P. Steiger, E. M. Miller, J. Org. Chem. 24, 1214 (1953); ibid, 18, 1427 (1953)), the reaction may proceed along two lines:

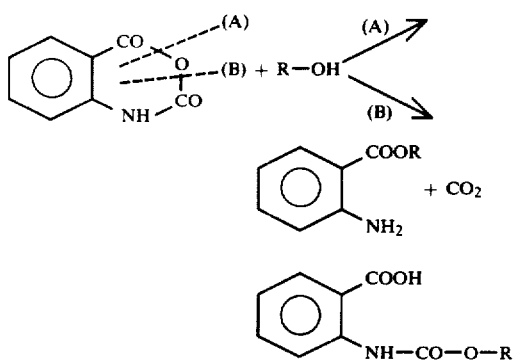

Thus, for example, when the reaction is carried out using aliphatic hydroxyl compounds, the reaction path along (A) leads to an anthranilic acid derivative and along (B) to a urethane-o-benzoic acid. The ratios in which the two reaction products are obtained depend to a great extent on the reaction conditions, particularly on the nature of the nucleophilic reagent, the catalyst, the reaction temperature, and the like.

The presence of free carboxyl groups in the products of the process often interferes severely with the quality of the polymers subsequently produced from these product mixtures by further reactions. Apart from any side reactions which the carboxyl groups may undergo, such as the reaction with isocyanates, the carboxyl groups have the effect of substantially reducing the resistance of the polymers to hydrolysis. It is therefore desirable to keep the number of carboxyl groups in the reaction products of polyols or polythiols and isatoic acid anhydride as low as possible.

In U.S. Pat. No. 3,808,250, a process is described wherein compounds containing OH and/or SH groups and having molecular weights of from 600 to 10,000 are reacted with substantially equivalent quantities of isatoic acid anhydride in the presence of a base. It was found, however, that in this process, the proportion of reaction mixture undergoing the above-described side reaction (B) is relatively high. As may be seen from the following Table 1, the reaction of polyethers with equivalent quantities of isatoic acid anhydride at about 110° C. in the presence of various catalysts yields products, in which the proportion of amine groups to acid groups (hereinafter referred to as A/S ratio) is in no case higher than 8:1.

Table 1

| Polyether | Catalyst | A/S ratio |
|---|---|---|
| linear copolymer of propylene oxide and ethylene oxide; OH number 56, primary OH groups | permethylated diethylene triamine | 8 : 1 |
| copolymer of propylene oxide and ethylene oxide; OH number 56, trifunctional, primary OH groups | permethylated diethylene triamine | 8 : 1 |
| copolymer of propylene oxide and ethylene oxide; OH number 41; trifunctional, secondary OH groups | dimethylbenzylamine/tetra-methylguanidine (10 : 1) | 3 : 1 |
| polypropylene oxide started on trimethylol propane; OH number 870 | dimethylbenzylamine/tetra-methylguanidine (10 : 1) | 5 : 1 |
| mixture of linear polypropylene oxide (OH number 56), triethanolamine and N-methyl-diethanolamine (100 : 4 : 6 parts, by weight) | — | 5 : 1 |

In U.S. Pat. No. 3,929,863, a proces is described wherein compounds containing OH and/or SH groups and having molecular weights of from 76 to 599 are reacted with from about 0.8 to 1.2 equivalents of isatoic acid anhydride in the presence of a base. Because of their relatively low molecular weight, the compounds described therein are excellent chain extenders for polyurethane resins.

DESCRIPTION OF THE INVENTION

It has now surprisingly been found that side reaction (B) described above is substantially suppressed if polyols or polythiols are reacted with a quantity of isatoic acid anhydride which is substantially smaller than the total quantity of hydroxyl and/or mercapto groups, optionally in the presence of organic or inorganic catalysts. The result is that the products obtained have a much smaller absolute quantity of carboxyl groups for a given proportion of amino groups (i.e. the A/S ratio is substantially higher) than in the modified polyethers prepared according to U.S. Pat. No. 3,808,250.

It has also surprisingly been found that if the products, which are partially "masked" polyols and contain free hydroxyl or mercapto groups in addition to amino groups, are used as starting components for the production of polyurethanes, the plastics products obtained have significantly better mechanical properties than those obtained from the products described in U.S. Pat. No. 3,808,250.

The present invention also relates to compounds corresponding to the following general formula:

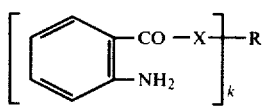

wherein
X represents oxygen or sulphur;
R represents a k-valent group as may be obtained by removal of k hydroxyl and/or mercapto groups from a polyalkylene (thio)ether poly(thi)ol which contains n hydroxyl and/or mercapto groups and has a molecular weight of from 1300 to 60,000;

n represents an integer of from 2 to 8; and k has an average value of from 0.05 n to 0.7 n, preferably from 0.1 n to 0.4 n.

The present invention also relates to a process for the production of cellular or non-cellular polyurethane resins from polyisocyanates, relatively high molecular weight compounds having isocyanate-reactive hydrogen atoms, and optionally chain lengthening agents, blowing agents, catalysts and other known additives characterized in that the high molecular weight compounds used which contain isocyanate-reactive hydrogen atoms comprise polyethers and polythio esters modified according to the present invention. The relatively high molecular weight compounds may optionally be in admixture with high molecular weight polyhydroxyl compounds or optionally be in admixture with low molecular weight polyhydroxyl compounds which have been modified with isatoic acid anhydride.

The product mixtures according to the present invention are prepared by the reaction of polyols and/or polythiols with from 5 to 70%, preferably from 10 to 40% of the equivalent quantity (based on the total quantity of hydroxyl and/or mercapto groups) of isatoic acid anhydride, optionally in the presence of basic organic and/or inorganic catalysts at temperatures of from 0° to 200° C., preferably from 20° to 130° C. The reaction may be carried out in the presence of inert solvents. The preferred basic catalysts, which may be used in quantities varying within wide limits are N,N-dimethylbenzylamine, N,N,N',N'-tetramethyl-guanidine, permethylated diethylene triamine, permethylated N-(2-aminoethyl)-piperazine, N,N'-endoethylenepiperazine, sodium hydroxide, potassium hydroxide and calcium hydroxide. The reaction is continued until evolution of gas ceases. The reaction lasts from 1 to 20 hours, depending on the reaction conditions. The resulting product mixture is then filtered, optionally with the addition of inert solvents. The product may then be used as such, for the production of polyurethane resins, optionally after removal of the solvent, or it may be isolated in the pure form. The product may be isolated by treatment with $CO_2$ (optionally after the addition of inert solvents), extraction by shaking with water and drying in a vacuum.

The polyether or polythioether polyols used as reactants for preparation of the products according to the present invention may be polyether polyols, polythioether polythiols or polyols or polythiols containing both polyether and polythioether segments which have molecular weights of from 1300 to 60,000 and preferably from 1500 to 6000.

It is preferred to use polyether polyols which are free from sulphur, and in particular polymers of ethylene oxide, propylene oxide or tetrahydrofuran or polyether polyols which contain ethylene oxide, propylene oxide and butylene glycol-(1,4) units in any sequence. Polyether polyols of this type may be obtained by known methods. For example polyalkylene polyethers may advantageously be prepared by polymerization (for example catalyzed by $BF_3$) of the corresponding alkylene oxides, e.g. ethylene oxide or propylene oxide, in the presence of suitable starter molecules, such as water, low molecular weight polyols or low molecular weight amines which have at least two nitrogen-hydrogen bonds. Low molecular weight polyols suitable for use as starter molecules include, ethylene glycol, propane-1,2-diol, tetramethylene diol, hexamethylene diol, glycerol, trimethylolpropane, pentaerythritol, sucrose, and the like. The starter molecules preferably used for the process according to the present invention are difunctional or trifunctional polyethers which may be obtained, by reaction of the alkylene oxides with divalent or trivalent representatives of the low molecular weight polyols mentioned above. Suitable starter molecules also include ammonia and low molecular weight amines having at least two nitrogen-hydrogen bonds, such as, methylamine, butylamine, aniline, diaminobenzene, diaminotoluene, and the like. Polyols containing nitrogen are also advantageously used as starters. Particularly useful are triethanolamine and N-methyldiethanolamine.

When such polyethers containing nitrogen are reacted with isatoic acid anhydride, it is generally unnecessary to use catalysts. Suitable polythioethers and polythio-mixed ethers include, in particular, the condensation products obtained by reacting thiodiglycol on its own or with the above-mentioned polyols.

According to the present invention, it is particularly preferred to modify sulphur-free trifunctional polyethers with isatoic acid anhydride.

According to the present invention, modification of the polyethers and/or polythio ethers may also be carried out using a certain proportion (from 0 to 90%, by weight, preferably from 0 to 60%, by weight, based on the total quantity of polyhydroxyl compounds) of low molecular weight polyhydroxyl compounds (molecular weight less than 1300). Both low molecular weight polyethers and the polyols mentioned above as starter molecules may be used for this purpose. The compounds preferably used are again compounds, such as triethanolamine and N-methyl-diethanolamine or their ethoxylation or propoxylation products because they function as catalysts at the same time.

The solvents used for the reaction or when working-up the reaction product may be any non-reactive solvents suitable for dissolving the starting materials and end products. The following are examples: methylene chloride, trichloroethylene, tetrahydrofuran, dioxane, methyl ethyl ketone, methyl isobutyl ketone, ethyl acetate and isobutyl acetate.

Production of synthetic resins from the new products according to the present invention by the isocyanate polyaddition process is carried out by the known methods of polyurethane chemistry.

The reaction of the new compounds with polyisocyanates may also be carried out in the presence of any of the additives commonly used in polyurethane chemistry, such as blowing agents, catalysts, flame retarding substances, and the like.

The polyisocyanates used as starting components according to the present invention may be essentially aliphatic, cycloaliphatic, araliphatic, aromatic or heterocyclic polyisocyanates. Suitable polyisocyanates include those described, e.g. by W. Siefken in Justus Liebigs Annalen der Chemie, 562, pages 75 to 136. Specific examples include ethylene diisocyanate; tetramethylene-1,4-diisocyanates; hexamethylene-1,6-diisocyanate; dodecane-1,12-diisocyanate; cyclobutane-1,3-diisocyanate; cyclohexane-1,3-and-1,4-diisocyanate and mixtures of these isomers; 1-isocyanato-3,3,5-trimethyl-5-isocyanatomethyl-cyclohexane (German Auslegeschrift No. 1,202,785 and U.S. Pat. No. 3,401,190); hexahydrotolylene-2,4- and -2,6-diisocyanate and mixtures of these isomers; hexahydrophenylene-1,3-and/or 1,4-diisocyanate; perhydrodiphenylene-2,4'- and/or 4,4'- diisocyanate; phenylene-1,3- and 1,4-diisocyanate; tolylene-2,4- and -2,6-diisocyanate and mixtures of these isomers; diphenylmethane-2,4'- and/or 4,4'-diisocyanate; naphthylene-1,5-diisocyanate; triphenylmethane-4,4',4"-triisocyanate; polyphenyl-polymethylene polyisocyanates which may be obtained by aniline-formaldehyde condensation followed by phosgenation as have been described, for example in British Patents 874,430 and 848,671; m- and p-isocyanatophenyl-sulphonylisocyanates as described in U.S. Pat. No. 3,454,606; perchlorinated aryl polyisocyanates as described, e.g. in U.S. Pat. No. 3,277,138; polyisocyanates containing carbodiimide groups as described in U.S. Pat. No. 3,152,162 diisocyanates, such as those described in U.S. Pat. No. 3,492,330; polyisocyanates having allophanate groups as described, e.g. in British Pat. No. 994,890 Belgian Pat. No. 761,626 and published Dutch Patent Application No. 7,102,524; polyisocyanates having isocyanurate groups as described, e.g. in U.S. Pat. No. 3,001,973, in German Pats. Nos. 1,022,789; 1,222,067 and 1,027,394 and in German Offenlegungsschriften Nos. 1,929,034 and 2,004,048; polyisocyanates having urethane groups as described, e.g. in Belgian Pat. No. 752,261 or in U.S. Pat. No. 3,394,164; polyisocyanates having acylated urea groups as described in German Pat. No. 1,230,778; polyisocyanates having biuret groups as described in U.S. Pats. Nos. 3,124,605 and 3,201,372 and in British Pat. No. 889,050; polyisocyanates prepared by telomerization reactions as described, e.g. in U.S. Pat. No. 3,654,106; polyisocyanates having ester groups as described in British Pats. Nos. 965,474 and 1,072,956, in U.S. Pat. No. 3,567,763 and in German Pat. No. 1,231,688; reaction products of the above-mentioned isocyanates with acetals as described in German Pat. No. 1,072,385; and polyisocyanates containing polymeric fatty acid groups as described in U.S. Pat. No. 3,455,883.

The distillation residues still containing isocyanate groups from the commercial production of isocyanates may also be used, optionally as solutions in one or more of the above-mentioned polyisocyanates. Mixtures of the above-mentioned polyisocyanates may, of course, be used.

It is generally preferred to use readily available polyisocyanates, such as tolylene-2,4- and -2,6-diisocyanate and mixtures of these isomers ("TDI"); polyphenylpolymethylene polyisocyanates obtainable by aniline-formaldehyde condensation followed by phosgenation ("crude MDI"); and polyisocyanates containing carbodiimide groups, urethane groups, allophanate groups, isocyanurate groups, urea groups or biuret groups ("modified polyisocyanates").

In addition to the modified polyethers according to the present invention, a quantity of from 0 to 100%, by weight, preferably from 0 to 50%, by weight (based on the quantity of modified polyether) of known high molecular weight polyhydroxyl compounds may be used in the reaction with the polyisocyanate. Apart from the polyethers and/or polythioethers mentioned above, these known polyhydroxyl compounds include, e.g. polyesters, polyester amides, polyether esters and polycarbonates containing from 2 to 8, preferably 2 or 3 hydroxyl groups and having molecular weights of from 500 to 60,000 preferably from 800 to 6000.

Representatives of these compounds optionally used according to the present invention are known and have been described, e.g. in High Polymers, Vol. XVI, "Polyurethanes, Chemistry and Technology" published by Saunders-Frisch, Interscience Publishers, New York, London Volume I, 1962, pages 32 to 42 and pages 44 to 54 and Volume II, 1964, pages 5 to 6 and 198 to 199 and in Kunststoff-Handbuch Volume VII, Vieweg-Hochtlen, Carl-Hanser Verlag, Munich, 1966 pages 45 to 71.

If low molecular weight polyhydroxyl compounds are also used in the modification reaction with isatoic acid anhydride, as described above, then the products obtained are mixtures which, in addition to the compounds according to the present invention, also contain partially modified low molecular weight polyols (in a quantity of from about 0 to 95%, by weight, preferably from 0 to 70%, by weight, most preferably from 0 to 50% by weight, based on the total mixture. Such mixtures may, of course, also be used according to the present invention for the production of polyurethane resins.

When it is desired to produce elastomeric resins, synthesis of the polyadduct is preferably carried out with the addition of low molecular weight compounds having at least two isocyanate-reactive hydrogen atoms. Chain lengthening agents of this type include, for example, diethylene glycol, triethylene glycol, tetraethylene glycol, polyethylene glycols having a molecular weight of up to 400, dipropylene glycol, polypropylene glycols having a molecular weight of up to 400, dibutylene glycol, polybutylene glycols having a molecular weight of up to 400, castor oil, 4,4'-dihydroxydiphenylpropane, dihydroxymethyl-hydroquinone, 1,4-phenylene-bis-(β-hydroxyethylether), ethanolamine, N-methylethanolamine, diethanolamine, N-methylethanolamine, triethanolamine, 3-aminopropanol, and the like, also useful are ester diols corresponding to one of the following general formula:

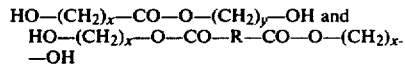

wherein
R represents an alkylene or arylene group having from 1 to 10 preferably from 2 to 6 carbon atoms;
x represents from 2 to 6 carbon atoms;
x represents from 2 to 6; and
y represents from 3 to 5.

Examples of ester diols corresponding to the general formula include δ-hydroxybutyl - ε-hydroxy-caproic acid ester, ω-hydroxy-hexyl-γ-hydroxybutyric acid ester, adipic acid-bis-(β-hydroxy-ethyl) ester and terephthalic acid-bis-(β-hydroxyethyl)-ester. Other suitable chain lengthening agents include diolurethanes corresponding to the following general formula:

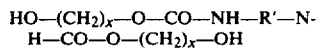

wherein
R' represents an alkylene, cycloalkylene or arylene group having from 2 to 15, preferably from 2 to 6 carbon atoms; and
X represents a number of from 2 to 6

Examples of such chain lengthening agents include 1,6-hexamethylene-bis-(β-hydroxyethylurethane) or 4,4'-diphenylmethane-bis-(δ-hydroxybutylurethane);
Diol ureas corresponding to the following general formula:

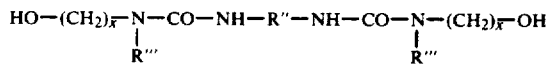

wherein

R" represents an alkylene, cycloalkylene or arylene group having from 2 to 15, preferably from 2 to 9 carbon atoms;

R''' represents H or CH₃; and

X represents 2 or 3 also suitable chain lengthening agents.

Examples of such diol ureas are 4,4'-diphenylmethane-bis-(β-hydroxyethylurea) and the compound:

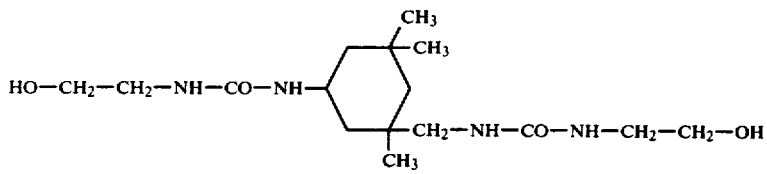

However, the chain lengthening agents preferably used in the production of synthetic resins from polyisocyanates and the new compounds according to the present invention are low molecular weight diprimary diamines. Aliphatic diamines suitable for the purpose of the present invention include, for example, ethylene diamine, tetramethylene-1,4-diamine, undecamethylene-1,11-diamine, dodecamethylene-1,12-diamine and mixtures thereof, 1-amino-3,5,5-trimethyl-5-aminomethyl-cyclohexane, hexahydrotolylene-2,4- and -2,6-diamine and mixtures thereof, perhydro-2,4'- and -4,4'-diaminodephenyl methane, p-xylyenediamine, bis-(3-aminopropyl)-methylamine, and the like. Hydrazine and substituted hydrazines, such as methyl hydrazine, N,N'-dimethylhydrazine and their homologues and acid dihydrazides may also be used according to the present invention. Examples of acid dihydrazides include carbodihyrazide, oxalic acid dihydrazide, the dihyrazides of malonic acid, succinic acid, glutaric acid, adipic acid, β-methyl adipic acid, sebacic acid, hydracrylic acid and terephthalic acid. Other suitable compounds include semicarbazidoalkylene hydrazides such as β-semicarbazido-propionic acid hydrazide (German Offenlegungschrift No. 1,770,591), semicarbozido-alkylene carbazic esters, such as 2-semicarbazidoethyl-carbazic ester (German Offenlegungsschrift No. 1,918,504) and amino semicarbazide compounds, such as β-aminoethyl-semicarbazidocarbonate (German Offenlegungsschrift No. 1,902,931).

Examples of suitable aromatic diamines include the bis-anthranilic acid esters as described in German Offenlegungsschrift No. 2,160,590 and U.S. Pat. No. 3,929,823, 3,5- and 2,4-diaminobenzoic acid esters as described in German Offenlegungsschrift No. 2,025,900, the diamines having ester groups described in German Offenlegungsschriften Nos. 1,803,635; 2,040,650 and 2,160,589 and 3,3'-dichloro-4,4'-diaminodiphenylmethane and 4,4'-diaminodiphenylmethane and 4,4'-diaminodiphenyl-disulphide.

Other chain lengthening agents which may be used according to the present invention include compounds, such as 1-mercapto-3-aminopropane, substituted or unsubstituted amino acids, such as glycine, alanine, valine, serine and lysine, and substituted or unsubstituted dicarboxylic acids, such as succinic acid, adipic acid, phthalic acid, 4-hydroxy-phthalic acid and 4-aminophthalic acid.

Compounds which are monofunctional in their reaction with isocyanates may also be used in proportions of from 0.01 to 10%, by weight, based on the solid polyurethane content, to serve as so-called "chain terminating agents". Monofunctional compounds of this type include e.g. monoamines, such as butylamine, and dibutylamine, octylamine, stearylamine, N-methylstearylamine, pyrorolidine, piperidine, and cyclohexylamine; monohydric alcohols, such as butanol, 2-ethylhexanol, octanol, dodecanol, the various amyl alcohols, cyclohexanol, ethylene glycol monoethyl ether, and the like.

Water and/or readily volatile organic substances may be used as blowing agents according to the present invention. Suitable organic blowing agents include, e.g. acetone; ethyl acetate; halogenated alkanes, such as methylene chloride, chloroform, ethylidene chloride, vinylidene chloride, monofluorotrichloromethane, chlorodifluoromethane and dichlorodifluoromethane; butane, hexane, heptane and diethylether. The action of a blowing agent may also be attained by adding compounds which decompose at temperatures above room temperature to liberate gases (e.g.). Azo compounds such as azoisobutyric acid nitrile are useful as decomposible compounds. Other examples of blowing agents and details concerning the use of blowing agents may be found, e.g., in Kunststoff-Handbuch, Volume VII, published by Vieweg and Höchtlen, Carl-Hanser-Verlag, Munich 1966, pages 108 to 109, 453 to 455 and 507 to 510.

Catalysts are often used according to the present invention. The catalysts used are of known type e.g. tertiary amines, such as triethylamine, tributylamine, N-methyl-morpholine, N-ethyl-morpholine, N-cocomorpholine, N,N,N',N'-tetramethylethylenediamine, 1,4-diaza-bicyclo-(2,2,2)-octane, N-methyl-N'-dimethyl-aminoethylpiperazine, N,N-dimethylbenzylamine, bis-(N,N-diethylaminoethyl)-adipate, N,N-diethylbenzylamine, pentamethyldiethylene triamine, N,N-dimethylcyclohexylamine, N, N, N', N'-tetramethyl-1,3-butanediamine, N,N-dimethyl-β-phenylethylamine, 1,2-dimethylimidazole and 2-methylimidazole. The known Mannich bases which may be obtained from secondary amines, such as dimethylamine, and aldehydes, preferably formaldehyde, or ketones, such as acetone, methyl ethyl ketone and cyclohexanone, an phenols, such as phenol, nonylphenol or bisphenol, may also be used as catalysts.

Catalysts in the form of tertiary amines having isocyanate-reactive hydrogen atoms may also be used and include e.g. triethanolamine, triisopropanolamine, N-methyldiethanolamine, N-ethyl-diethanolamine, N,N,-dimethyl-ethanolamine and the reaction products thereof with alkylene oxides, such as propylene oxide and/or ethylene oxide.

Silaamines having carbon-silicon bonds as described, e.g. in U.S. Pat. No. 3,620,984 may also be used as catalysts. Suitable examples include 2,2,4-trimethyl-2- silamorpholine or 1,3-diethylaminoethyl-tetramethyldisiloxane.

Other suitable catalysts include nitrogen-containing bases, such as tetraalkylammonium hydroxides, alkali metal hydroxides, such as sodium hydroxide, alkali metal phenolates such as sodium phenolate, or alkali metal alcohols, such as sodium methylate. Hexahydrotriazines may also be used as catalysts.

Organic metal compounds, such as organic tin compounds, may also be used as catalysts according to the present invention. The organic tin compounds used as catalysts are preferably tin(II) salts of carboxylic acids, such as tin (II) acetate, tin(II) octoate, tin (II) ethyl hexoate or tin (II) laurate, and tin (IV) compounds, such as dibutyl tin oxide, dibutyl tin dichloride, dibutyl tin diacetate, dibutyl tin dilaurate, dibutyl tin maleate or dioctyl tin diacetate.

Any of the above-mentioned catalysts may, of course, also be used as mixtures. Other examples of catalysts which may be used according to the present invention are details concerning the mode of action of the catalysts are known may be found, e.g., in Kunststoff-Handbuch, Volume VII, published by Vieweg and Höchtlen, Carl-Hanser-Verlag, Munich 1966, pages 96 to 102. The catalysts are generally used in quantity of from about 0.001 to 10%, by weight, based on the compounds according to the present invention.

Surface active additives, such as emulsifiers and foam stabilizers, may also be used. Suitable emulsifiers include, e.g. the sodium salt of ricinoleic sulphonates or salts of fatty acids with amines, such as oleic acid diethylamine or stearic acid diethanolamine. Alkali metal or ammonium salts of sulphonic acids, such as dodecylbenzene sulphonic acid or dinaphthylmethane disulphonic acid, or of fatty acids may also be included as surface active additives. The foam stabilizers used are mainly polyether siloxanes, especially those which are water-soluble. These compounds generally have a polydimethylsiloxane group attached to copolymer of ethylene oxide and propylene oxide. Foam stabilisers of this type are known and have been described, for example, in U.S. Pat. Nos. 2,834,748; 2,917,480 and 3,629,308.

Reaction retarders, e.g. compounds which are acid in reaction, such as hydrochloric acid or organic acid halides, may also be used according to the present invention. Other additives which may be used include known cell regulators, such as paraffins or fatty alcohols or dimethyl polysiloxane; pigments and dyes; flame retarding agents, such as tris-chloroethylphosphate, tricresylphosphate and ammonium phosphate and polyphosphate; stabilizers against ageing and weathering; plasticizers; fungistatic and bacteriostatic; substances; and fillers, such as barium sulphate, kieselguhr, carbon black or whiting.

Other examples of surface active additives, foam stabilizers, cell regulators, reaction retarders, stabilizers, flame retarding substances, plasticizers, dyes, fillers and fungistatic and bacteriostatic substances optionally used according to the present invention and details concerning the use and mode of action of these additives are known and may be found, e.g., in Kunststoff-Handbuch, Volume VII, published by Vieweg and Hochtlen, Carl-Hanser-Verlag, Munich, 1966, pages 103 to 113.

According to the present invention, the starting materials may be reacted together by the known one-shot process, prepolymer process or semi-prepolymer process, often using mechanical devices, e.g. those described in U.S. Pat. No. 2,764,565. Processing apparatus which may also be used according to the present invention are described in Kunststoff-Handbuch, Volume VII, published by Vieweg and Hochtlen, Carl-Hanser-Verlag, Munich 1966, pages 121 to 205.

The production of foams according to the present invention is often carried out in molds. In this process, the reaction mixture is introduced into a mold which may be made of a metal, such as aluminum, or a synthetic resin compound, such as epoxide resin. The reaction mixture foams inside this mold to form the molded product. The process of foaming in the mold may be carried out to produce a molding having a cellular structure on its surface or it may be carried out to produce a molding having a compact skin and cellular core. According to the present invention, the first result may be obtained by introducing just sufficient reaction mixture into the mold to fill the mold with foam product. Alternatively a larger quantity of foamable reaction mixture may be introduced than is necessary for filling the mold with foam. This method is known as "overcharging", a procedure which has been disclosed, e.g. in U.S. Pat. No. 3,182,104.

When foaming is carried out inside molds, known so-called "external mold release agents" such as silicone oils, are frequently used. So-called "internal mold release agents" may also be used, optionally together with external mold release agents, as described in German Offenlegungsschriften No. 2,121,670 and 2,307,589.

Cold setting foams may also be produced according to the present invention (see, e.g., British Pat. No. 1,162,517, and German Offenlegungsschrift No. 2,153,086).

Foams may, of course, also be produced by the process of block foaming or by the known laminator process.

The polyurethane resins produced from the polymers according to the present invention have improve tensile strength and structural strength, as shown in the Examples given below. In the Examples measurements of the flexural strength under heat and other physical properties are made.

Quantities given in the Examples are to be understood, as parts, by weight, or percentages, by weight, unless otherwise indicated.

EXAMPLES 1

1500 g of a bifunctional copolymer of 90% of propylene oxide and 10% of ethylene oxide (OH number 56; primary OH groups) was dehydrated at 120° C. and 15 Torr for 30 minutes. After the copolymer had been cooled to 30° C., 24.4 g of isatoic acid anhydride and 22.5 g of permethylated diethylene triamines were added (equivalent ratio of hydroxyl groups: isatoic acid anhydride = 10:1). The suspension was heated to 110° C. with vigorous stirring and the temperature was maintained constant until evolution of carbon dioxide ceased. The reaction mixture was then cooled to 20° C., degasified under vacuum at a bath temperature of 20° C. for 30 minutes and filtered off. 1525 g (99.3%) of the theoretical yield) of a viscous, pale yellow substance having a bluish fluorescence was obtained.

Determination of the amino end groups in the reaction product was carried out by titration in glacial acetic acid solution containing 0.1 N HClO$_4$ in glacial acetic acid. Determination of the carboxyl group was determined by titration with aqueous 0.1 N NaOH in toluene/ethanol (1:1). If, in the determination of amino groups, basic catalysts remained in the mixture after the reaction, the quantity of bases was taken into account by suitable correction against a blank, and the same method was adopted when polyols containing nitrogen were used.

NH$_2$: 0.19 mequ./2g; COOH: 0.01 mequ./2 g; A/S ratio: 19.1

EXAMPLE 2

The same procedure as in Example 1 was employed, but using 1000 g of a copolymer of propylene oxide and ethylene oxide (OH number 56, primary OH groups) which had been started on trimethylolpropane, 54.4 g of isatoic acid anhydride and 15 g of permethylated diethylene triamine (ratio of hydroxyl groups to isatoic acid anhydride 3:1).

Yield: virtually quantitative.

Analysis of reaction product: NH$_2$: 0.63 mequ./2 g COOH: 0.04 mequ./2 g; A/S ratio: 18.1.

EXAMPLE 3

The procedure was the same as described in Example 1, but using a mixture of 400 g of a copolymer of propylene oxide and ethylene oxide (OH number 41, secondary OH groups) which had been started on 400 g of a trimethylolpropane, 600 g of an ethoxylated trimethylolpropane (OH number 870), 784 g of isatoic acid anhydride, 30 g of dimethylbenzylamine and 5 g of tetramethylguanidine (ratio of hydroxyl groups to isatoic acid anhydride=2:1).

Yield: virtually quantitative.

NH$_2$: 5.2 mequ./2 g; COOH: 0.38 mequ./2 g; A/S ratio: 14.1.

EXAMPLE 4

The procedure was the same as described in Example 1, but using 1000 g of a copolymer of propylene oxide and ethylene oxide (OH number 41, secondary OH groups) which had been started on trimethylolpropane, 59.8 g of isateic acid anhydride and 3.9 g of sodium hydroxide (ratio of hydroxyl groups to isatoic acid anhydride 2:1).

After termination of the reaction, the reaction mixture was cooled, diluted with 3 liters of methylene chloride and filtered. 4 liters of water were added, carbon dioxide was introduced for 15 minutes and the organic phase was separated off and shaken twice with water and the solvent was removed under vacuum.

Yield 990 g (95.1% of the theoretical yield).

NH$_2$: 0.69 mequ./2 g; COOH: 0.03 mequ./2 g; A/S ratio: 23:1.

EXAMPLE 5

The procedure was the same as described in Example 1, but using a mixture of 300 g of butane-1,4-diol, 500 g of the trifunctional polyether from Example 2, 389 g of isatoic acid anhydride and 7.5 g of permethylated diethylene triamine (ratio of hydroxyl groups: isatoic acid anhydride 3:1).

Yield virtually quantitative.

NH$_2$: 4.27 mequ./2 g; COOH: 0.16 mequ./2 g; A/S ratio: 27:1.

EXAMPLE 6

The procedure was the same as described in Example 1, but using a mixture of 1000 g of a linear polypropylene oxide (OH number 56), 100 g of N-methyl-ethanolamine, 50 g of triethanolamine and 302 g of isatoic acid anhydride (ratio of hydroxyl groups: isatoic acid anhydride about 2:1).

Yield virutally quantitative.

NH$_2$: 2.74 mequ./2 g; COOH: 0.08 mequ./2 g; A/S ratio: 33.1.

EXAMPLE 7

A test plate (300×200×10 mm) was prepared using the modified polyether from Example 1.

Formulation:

105 g of modified polyether polyol
60 g of butane-1,4-diol
1.5 g of 1,4-diaza-bicyclo-(2,2,2)-octane
275 g of reaction product of 5 mol of 4,4'-diphenylmethane diisocyanate and 1 mol of tripropylene glycol
10 g of monofluorotrichloromethane.

The components were vigorously mixed at room temperature and then rapidly poured into a mold having the above test plate dimensions which was designated to be sealed and had been heated to 60° C. The polyurethane was cured by heating in the mold. For comparison, the experiment was repeated using corresponding quantities of the unmodified polyether and polyether which had been 100% modified according to U.S. Pat. No. 3,808,250.

The improved structural strength of polyurethanes produced according to the present invention was determined by the sagging test at various temperatures (based on DIN 53424).

Table 2

| | Degree of modification [%] | Sagging [mm] | | |
|---|---|---|---|---|
| | | 90° C. | 110° C. | 130° C. |
| Comparison example | 0 | 6 | 7 | 28 |
| Example 7 | 10 | 4 | 6 | 19 |
| Comparison example | 100 | 5 | 7 | 24 |

EXAMPLE 8

A test plate (300×200×10 mm) was prepared as described above, using a trifunctional copolymer of 90% of propylene oxide and 10% of ethylene oxide (initial molecular weight 4000) which by analogy with Example 2 had been modified with isatoic acid anhydride to an extent of 40 mol %.

Formulation 90 g of modified polyol
120 g of trifunctional polyol (reaction product of 1 mol of trimethylolpropane and 1 mol of ethylene oxide; OH-number 870
7 g of tetramethylguanidine/dimethylbenzylamine (1:10; NCO-content 30.57.)
290 g of a crude polyisocyanate mixture obtainable by formaldehyde condensation of aniline followed by phosgenation (viscosity: 100 cP at room temperature)
10 g of monofluorotrichloromethane For comparison, the experiment was repeated using unmodified polyether.

Table 3 below shows the improved flexural strength under heat of the polyurethane which had been produced from the partially modified polyether according to the present invention.

Table 3

|  | Degree of modification [%] | Sagging [mm] 110° C. | 130° C. |
|---|---|---|---|
| Example 10 | 40 | 3 | 4 |
| Comparison example | 0 | 7 | 8 |

EXAMPLE 9

212 g of a polypropylene glycol which had an initial molecular weight of 2000 and had been 50% modified with isatoic acid anhydride by the procedure according to Example 1 were reacted with 36.5 g of tolylene diisocyanate (80% 2,4-isomer and 20% 2,6-isomer) at 120° C. for 60 minutes. A further 3.4 g of tolylene diisocyanates were then added and the mixture was degasified at 75 Torr and 100° C. for 3 minutes. 25.2 g of 3,5-diamino-4-chloro-benzoic acid isobutyl ester were then added and the reaction mixture was stirred for 20 seconds, poured on a preheated plate (110° C.) and cured by heating at 100° C. for 24 hours. An elastomer having the following properties was obtained:

| Tensile strength: | 11.2 MPa |
|---|---|
| Structural strength: | 305 N |
| Shore hardness A: | 85 |
| Elasticity: | 43%. |

When an unmodified polypropylene glycol of the same molecular weight is used under analogous conditions, an elastomer having the following properties is obtained:

| Tensile strength: | 8.5 MPa |
|---|---|
| Structural strength: | 257 N |
| Shore hardness A: | 86 |
| Elasticity: | 44%. |

EXAMPLE 10

202 g of a polypropylene glycol which has an initial molecular weight of 2000 and had been 10% modified with isatoic acid anhydride by the general method described in Example 1 were reacted with 36.5 g of tolylene diisocyanate (80% 2,4-isomer and 20%, 2,6-isomer) at 120° C. for 60 minutes. The mixture was then degasified at 75 Torr and 100° C. and mixed with 25.2 g of 3,5-diamino-4-chlorobenzoic acid isobutyl ester. The reaction mixture was stirred for 20 seconds, poured on a preheated plate (110° C.) and cured by heating at 110° C. for 24 hours. An elastomer having the following properties is obtained:

hz,1/32
| Tensile strength: | 10.4 MPa |
|---|---|
| Structural strength: | 291 N |
| Shore hardness A: | 85 |
| Elasticity: | 44% |

When an unmodified polypropylene glycol of the same molecular weight was used under analogous conditions, an elastomer having the following properties was obtained:

| Tensile strength: | 8.3 MPa |
|---|---|
| Structural strength: | 257 N |
| Shore hardness A: | 86 |
| Elasticity: | 44% |

What is claimed is:

1. Compounds corresponding to the following general formula:

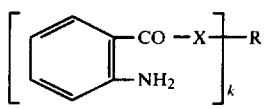

wherein

X represents oxygen or sulphur;

R represent a k-valent radical obtainable by removal of k hydroxyl and/or mercapto groups from a material selected from the group consisting of polyether polyols, polythioether polythiols, polyols containing both polyether and polythioether segments and polythiols containing both polyether and polythioether segments, said material having n hydroxyl and/or mercapto groups and a molecular weight of from 1300 to 60,000;

n represents an integer of from 2 to 8; and k has an average value of from 0.05 n to 0.7 n.

2. Compounds corresponding to the following general formula:

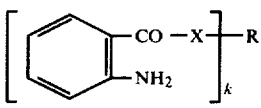

wherein

X represents oxygen

R represents a k-valent radical obtainable by removal of k hydroxyl and/or mercapto groups from a material selected from the group consisting of polyether polyols, polythioether polythiols, polyols containing both polyether and polythioether segments and polythiols containing both polyether and polythioether segments, said material having n hydroxyl and/or mercapto groups and a molecular weight of from 1300 to 60,000;

n represents an integer of from 2 to 8; and k has an average of from 0.05 n to 0.7 n.

3. Compounds according to claim 2, characterized in that n represents 2 or 3.

4. Compounds according to claim 2 characterized in that k has an average value of from 0.1 n to 0.4 n.

5. Compounds according to claim 2 characterized in that R represents the k-valent group of a polyethylene oxide, a polypropylene oxide or a polytetrahydrofuran.

* * * * *